United States Patent [19]

Yoshida et al.

[11] 4,109,102
[45] Aug. 22, 1978

[54] PHASE SYNCHRONIZING CIRCUIT

[75] Inventors: Yasuharu Yoshida; Yoshimi Tagashira, both of Tokyo, Japan

[73] Assignee: Nippon Electric Company, Ltd., Tokyo, Japan

[21] Appl. No.: 743,910

[22] Filed: Nov. 22, 1976

[30] Foreign Application Priority Data

Dec. 2, 1975 [JP] Japan .................................. 50-144265
Jan. 30, 1976 [JP] Japan ..................................... 51-9068
Apr. 8, 1976 [JP] Japan .................................... 51-39742

[51] Int. Cl.² .............................................. H04L 7/00
[52] U.S. Cl. ............................................... 178/69.1
[58] Field of Search ....................... 178/53, 67, 69.1; 179/15 BS; 328/55, 155, 133; 325/60, 63, 320; 329/50; 340/146.1 D

[56] References Cited

U.S. PATENT DOCUMENTS 3,445,593 5/1969 Gray et al. .......................... 325/60 X
3,983,499 9/1976 Tan ...................................... 325/320

Primary Examiner—Benedict V. Safourek
Attorney, Agent, or Firm—Ostrolenk, Faber, Gerb & Soffen

[57] ABSTRACT

A phase synchronizing circuit for processing a $2^n-$ phase phase modulated input signal wherein the signal is detected by phase detectors each of whose outputs are then phase shifted through a phase angle determined by the ratio of $a:b = 1:\tan(\pi/2^{n+1})$ where $a$ represents the amplitude of the phase detector output and $b$ represents the amplitude of a signal orthogonal to the signal $a$. The $2^n$ phase shifted signals repetitively undergo frequency doubling and then a combined signal from each pair of doublers is generated to successively reduce the signals to $2^{n-1}$ in number, then $2^{n-2}$ in number, and so forth, until only one pair of signals remains. A difference signal of the pair of signals is formed, which difference signal represents an error signal and is employed to operate a voltage controlled oscillator serving as the signal to be compared at each phase detector with the input signal, after undergoing an appropriate phase shift.

The phase shift of each phase detector output signal is accomplished by attenuating the output signal of that one of the remaining phase detectors which is orthogonal with the output signal undergoing phase shift wherein the respective ratios of the amplitudes of the signals are $1:\tan(\pi/2^{n+1})$. The output signal being phase shifted and the attenuated output signal being used to control the magnitude of the phase shift are combined in an adder (or subtractor) circuit to effect the phase shift.

11 Claims, 15 Drawing Figures

_FIG.3._

_FIG.4._

_FIG.5._

PHASE SYNCHRONIZING CIRCUIT

BACKGROUND OF THE INVENTION

The present invention relates to a phase synchronizing circuit for recovering a synchronized carrier wave from a multi-phase PSK (phase-shift-keying)-modulated carrier wave for demodulation, and more particularly, to a phase synchronizing circuit composed of base-band signal processing circuits.

Usually, a phase synchronizing circuit necessary for demodulation uses an inverse modulation system, a remodulation system, a frequency multiplication system, etc. in which signal processing is carried out in a high frequency band (or a carrier wave-band), but recently phase synchronizing circuits relying upon base-band signal processing are being investigated. The base-band signal processing circuits are advantageous in that they may be inexpensively manufactured. That is, since the frequency to be processed is in the base-band frequency region, realization of the circuit arrangement is easy and of low cost. In addition, since a phase error signal is derived from a deviation from an optimum point in a demodulated eye-pattern signal, an optimum demodulated pattern signal can be obtained.

On the other hand, base-band signal processing circuits are somewhat inaccurate. Thus, a phase error signal corresponding to the phase difference between the demodulated carrier wave and the recovered carrier wave is produced in the phase synchronizing circuit in which signal processing is carried out in a carrier wave-band. Accordingly, if a quadruple frequency-multiplier output is obtained as a phase error signal (for example, in the case of a 4-phase PSK-modulated carrier wave) then even if its phase stable point should deviate from that of the demodulated output, phase synchronization could be accomplished by varying an electrical length in a carrier wave-band. In the case of a phase synchronizing circuit relying upon base-band signal processing, since a phase error signal is produced by synthesizing amplitudes of demodulated eye-pattern signals, phase synchronization by varying an electrical length is impossible. In the heretofore known methods, only $\pm(\pi/4)$ phase-shifters (in which phase-shift is accomplished by performing addition or subtraction between orthogonal demodulated signals) have been used. Consequently, there is a first disadvantage that only when a quadruple frequency-multiplied output is obtained as a phase error signal and also a phase stable point of the quadruple frequency-multiplied output and that of a demodulated signal coincide with each other, the phase synchronizing circuit would be practically useful, but if the phase stable point is deviated outside of $\pm(\pi/4)$, then the phase synchronizing circuit would be practically useless.

Further, a D.C. component is usually included in the phase error signal obtained by synthesizing the demodulated signals. Consequently, there is a second disadvantage that if level variation should occur in an input signal, the D.C. value of the phase stable point in the phase error signal would be varied, resulting in the variation of a phase-locking center frequency and in a stationary phase error.

BRIEF DESCRIPTION AND OBJECTS OF THE INVENTION

It is one object of the present invention to provide a phase synchronizing circuit including phase shifters, which eliminates the above-described first disadvantage of a phase synchronizing circuit relying upon base-band processing.

Another object of the present invention is to provide a phase synchronizing circuit not containing a D.C. component in a phase error signal, which eliminates the above-described first and second disadvantages.

According to one feature of the present invention, there is provided a $2^n$-phase ($n=2, 3, 4 \ldots$) phase synchronizing circuit comprising $2^{n-1}$ phase detectors for detecting and demodulating a $2^n$-phase phasemodulated signal, $2^p$ phase-shifters ($p \geq 0$; $p = n-1, n-2, n-3, n-4, \ldots, 0$) for phase-shifting $2^p$ demodulated signals among the demodulated signals of said phase detectors by $(\pi/2^{n+1})$ radians by adding or subtracting a demodulated signal orthogonal to said $2^p$ demodulated signals to or from said $2^p$ demodulated signals at an amplitude ratio of $1 : \tan(\pi/2^{n+1})$, means for obtaining a phase error signal by synthesizing the outputs of said phase-shifters, and a variable frequency oscillator responsive to the output of said phase error signal means for transmitting signals to said phase detectors.

According to another feature of the present invention, there is provided a $2^n$-phase ($n=2, 3, 4, \ldots$) phase synchronizing circuit comprising $2^{n-1}$ phase detectors for detecting a $2^n$-phase phasemodulated signal, $2^n$ phase-shifters for phase-shifting the respective demodulated signals of said phase detectors by $\pm\pi/2^{n+1}$ radians by adding and subtracting a demodulated signal orthogonal to said respective demodulated signals to and from said demodulated signals at an amplitude ratio of $1 : \tan(\pi/2^{n+1})$, means for obtaining a phase error signal by synthesizing the outputs of said phase-shifters, and a variable frequency oscillator responsive to the output of said phase error signal means for transmitting signals to said phase detectors.

BRIEF DESCRIPTION OF THE FIGURES

Above-mentioned and other features and objects of this invention will become more apparent by reference to the following description taken in conjunction with the accompanying drawings, in which.

DETAILED DESCRIPTION OF THE INVENTION

Figure 1:
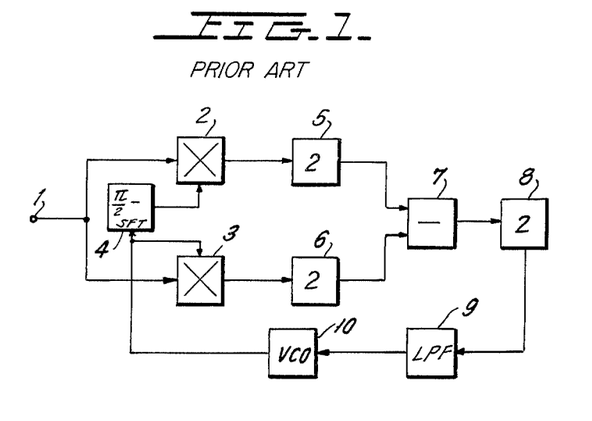
FIG. 1 shows one example of a conventional 4-phase phase synchronizing circuits which include a subtractor and squaring circuits for obtaining a phase error signal and which cannot operate correctly.

Referring now to the drawings, FIG. 1 illustrates a prior art 4-phase phase synchronizing circuits which includes a subtractor and squaring circuits and which cannot operate correctly despite the fact that a quadruple frequency-multiplied output is obtained.

In this figure, reference numeral 1 designates an input signal terminal; 2, a first phase detector; 3, a second phase detector; 4, a ($\pi/2$) phase-shifter (SFT), 5, 6 and 8, squaring circuits (or absolute value circuits); 7, a subtractor; 9, a low-pass filter (LPF); and 10, a voltage controlled oscillator VCO or a variable frequency oscillator (hereinafter referred to simply as "oscillator"). An output of the oscillator 10, which oscillates approximately at a carrier frequency of an input signal, is fed directly to the second phase detector 3 and is fed to the first phase detector 2 via the ($\pi/2$) phase-shifter 4. A that phase comparison is made between these signals and the input singal so as to obtain demodulated signals at the outputs of detectors 2 and 3. The demodulated signals of the first and second phase detectors 2 and 3 are fed to the squaring circuits 5 and 6, respectively, where the demodulated signals are squared and applied to the subtractor 7. The resulting difference signal 7 is fed to the squaring circuit 8.

Figure 2:
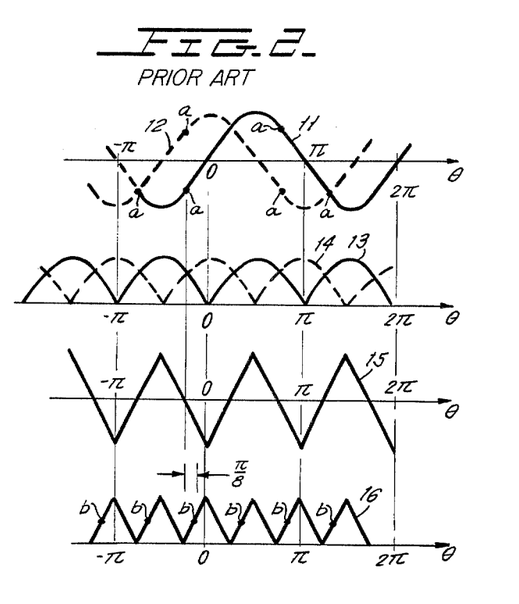
FIG. 2 shows waveform diagrams of output waveforms at various points in the circuit shown in FIG. 1.

FIG. 2 shows output signal waveforms at the respective circuit components, in which reference numeral 11 designates an output signal at the first phase detector 2; 12, an output signal at the second phase detector 3; 13, an output signal at the squaring circuit 5; 14, an output signal at the squaring circuit 6; 15, an output signal at the subtractor 7; and 16, an output signal at the squaring circuit 8. It is to be noted that on the abcissa is taken a phase difference between the respective input signals at the first phase detector 2, and that curves 13 and 14 are traced with respect to the case where full-wave rectifiers are used for the squaring circuits 5 and 6.

As will be obvious from FIG. 2, a quadruple frequency-multiplied output, represented by curve 16, is obtained as a phase error signal. However, there exists a phase deviation of ($\pi/8$) between phase stable points of the demodulated signals such as points $a$ on the curves 11 and 12 and phase stable points of the quadruple frequency-multiplied output such as points $b$ on the curve 16, and therefore, the illustrated circuit cannot operate as a phase synchronizing circuit.

However, it can be seen that if the above-mentioned phase deviation of ($\pi/8$), that is, the above-referred first disadvantage could be elminated, then the illustrated circuit would operate as a phase synchronizing circuit.

Figure 3:
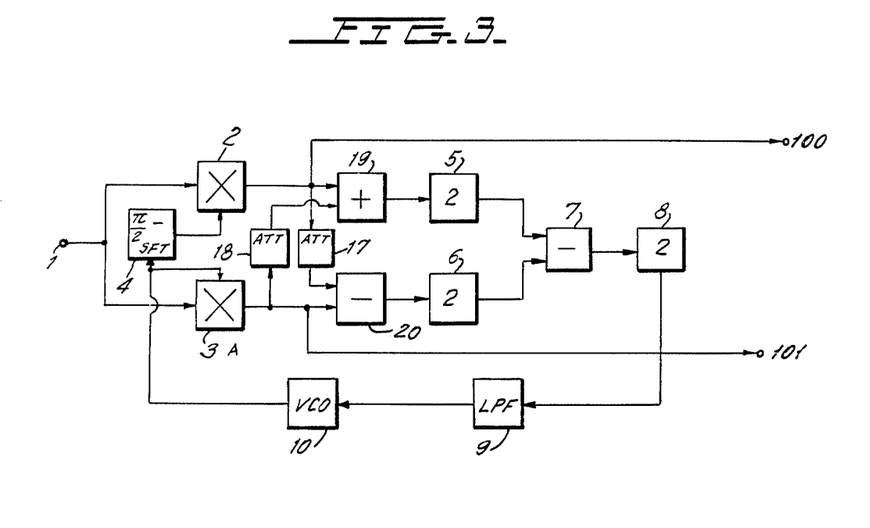
FIG. 3 shows one preferred embodiment of the 4-phase phase synchronizing circuit according to the present invention.
Figure 4:
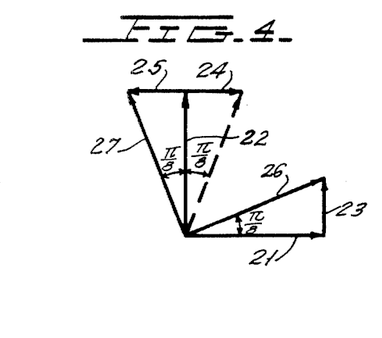
FIG. 4 is a vector diagram for the phase-shifters shown in FIG. 3.

Referring now to FIG. 3, there is shown a 4-phase phase synchronizing circuit according to the present invention which includes an adder, subtractors and squaring circuits. In FIG. 3, two ($\pi/8$) phase-shifters consisting of an attenuator (ATT) 18 and an adder 19, and an attenuator 17 and a subtractor 20, respectively, are added to the circuit shown in FIG. 2. the principle of this ($\pi/8$) phase-shifter will be explained hereunder with reference to a vector diagram shown in FIG. 4. In this figure, reference numeral 21 designates a first demodulated signal; 22, a second demodulated signal; 23, the second demodulated signal as passed through the attenuator 18; 24, the first demodulated signal as passed through the attenuator 17; 25, a signal obtained by phase-shifting the vector 24 $\pi$; 26, an output signal from the adder 19; and 27, an output signal from the subtractor 20. If the amplitude ratio of the first demodulated signal 21 to the second demodulated signal 23, as passed through the attenuator 18 is selected at 1 : tan ($\pi/8$), and if they are added by the adder 19, then the combined signal is represented by a vector 26. Likewise, if the amplitude ratio of the second demodulated signal 22 to the first demodulated signal 24 as passed through the attentuator 17 is selected at 1 : tan ($\pi/8$), and if the subtraction is performed in the subtractor 20, then the combined signal is represented by a vector 27. It is to be noted that subtraction of the vector 24 from the vector 22 is equivalent to the addition of the vector 25 and the vector 22. Through the abovementioned operations, the output signals from the adder 19 and the subtractor 20 would be advanced in phase with respect to the first and second demodulated signals 21 and 22, respectively.

Figure 5:
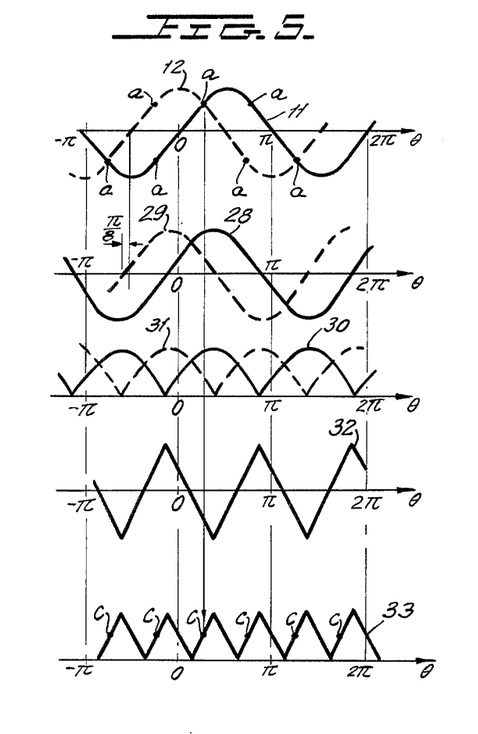
FIG. 5 shows waveform diagrams of output waveforms at various points in the circuit shown in FIG. 3.

FIG. 5 is a representation of waveforms at various points in the circuit shown in FIG. 3. In this figure, reference numeral 11 designates an output waveform from the first phase detector 2; 12, that from the second phase detector 3; 28, that from the adder 19; 29, that from the subtractor 20; 30, that from the squaring circuit 5; 31, that from the squaring circuit 6; 32, that from the subtractor 7; and 33, that from the squaring circuit 8. It is to be noted that on the abscissa is taken a phase difference between the respective input signals at the first phase detector 2, and that the curves 30 and 31 show the waveforms in the case where full-wave rectifiers are used for the squaring circuits 5 and 6. As will be obvious from FIG. 5, since phase stable points of the demodulated outputs as represented by points $a$ on the curves 11 and 12 and phase stable points of the fourfold frequency-multiplied output as represented by points $c$ on the curve 33 coincide with each other, if the output is fed to an oscillator 10 via a low-pass filter 9 to control the oscillation phase, then the illustrated circuit functions as a phase synchronizing circuit.

Figure 6:
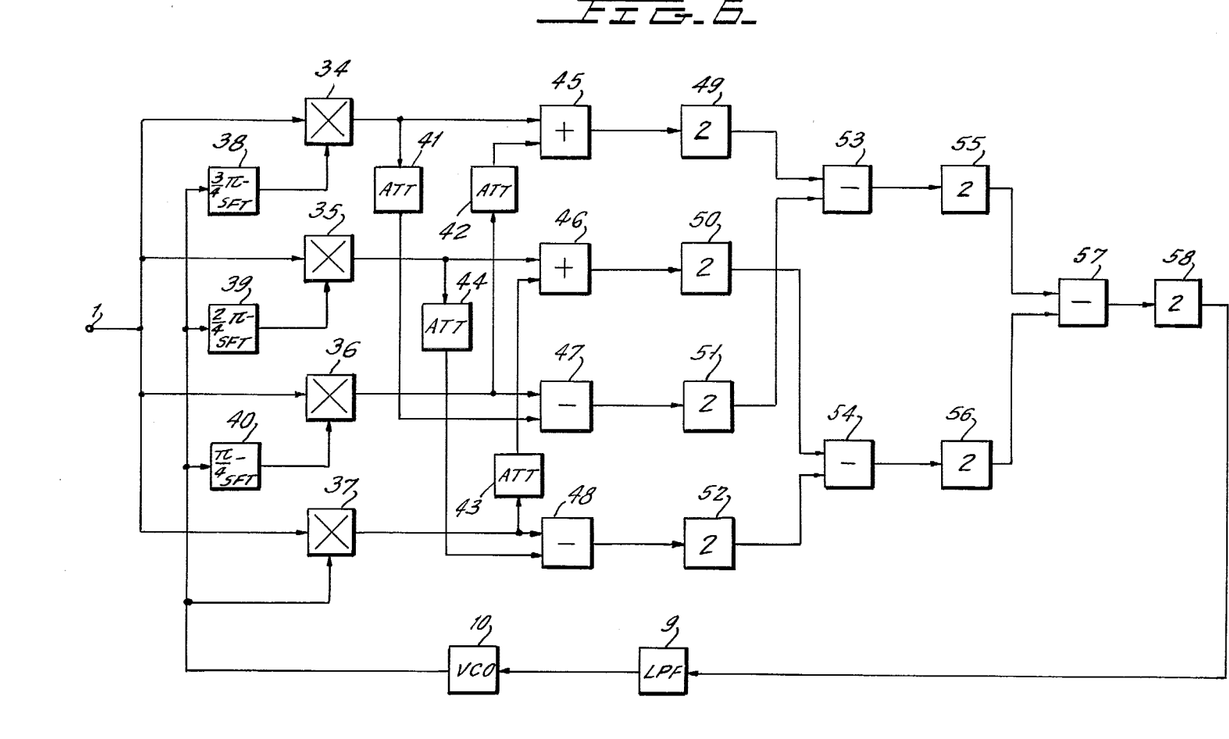
FIG. 6 shows one preferred embodiment of an 8-phase phase synchronizing circuit according to the present invention.

FIG. 6 shows an 8-phase phase synchronizing circuit according to the present invention. In this figure, reference numeral 34 designates a first phase detector; 35, a second phase detector; 36, a third phase detector; 37, a fourth phase detector; 38, a ($\frac{3}{4}$)$\pi$ phase-shifter; 39, a (2/4)$\pi$ phase-shifter; 40, a ($\pi/4$) phaseshifter; 41 ~ 44, attenuators; 45 and 46, adders 47 and 48, subtractors; 49 ~ 52, squaring circuits; 53 and 54, subtractors; 55 and 56, squaring circuits; 57, a subtractor circuit; and 58, a squaring circuit.

Figure 7:
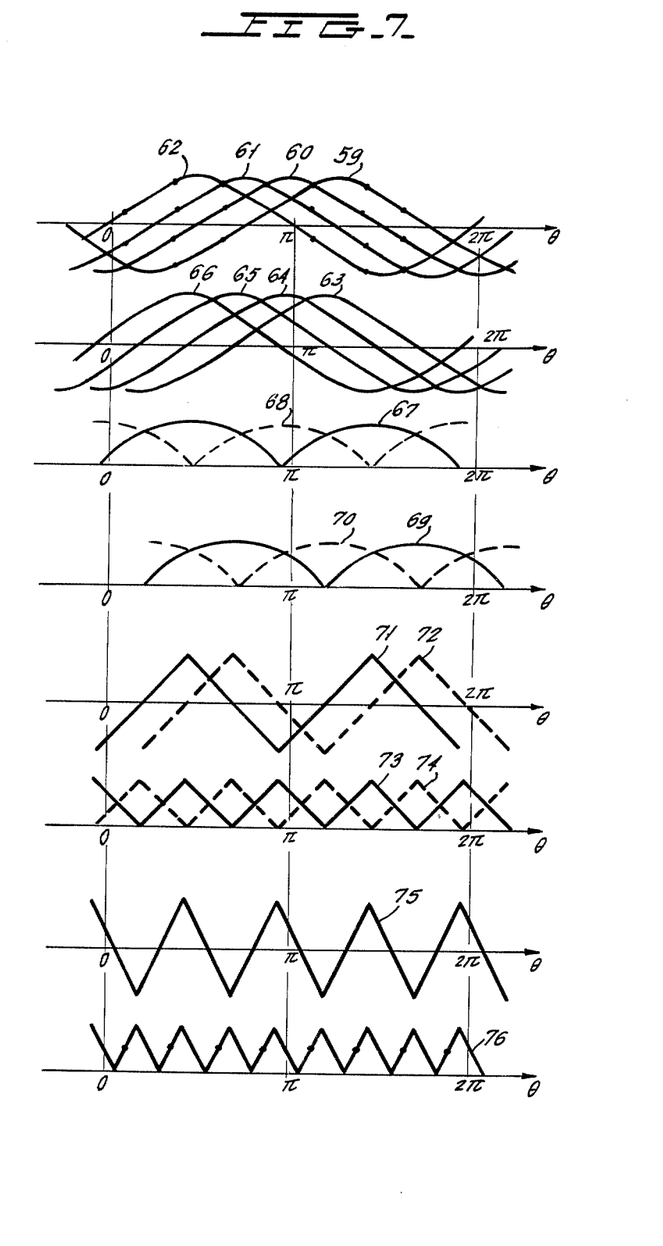
FIG. 7 shows waveform diagrams of output waveforms at various points in the circuit shown in FIG. 6.

Output waveforms of the respective circuit components in FIG. 6 are illustrated in FIG. 7, in which reference numeral 59 designates an output waveform of the first phase detector 34; 60, that of the second phase detector 35; 61, that of the third phase detector 36; 62, that of the fourth phase detector 37; 63, that of the adder 45; 64, that of the adder 46; 65, that of the subtractor 47; 66, that of the subtractor 48; 67, that of the squaring circuit 52; 68, that of the squaring circuit 50; 69, that of the squaring circuit 51; 70, that of the squaring circuit 49; 71, that of the subtractor 54; 72, that of the subtractor 53; 73, that of the squaring circuit 56; 74, that of the squaring circuit 55; 75, that of the subtractor 57; and 76, that of the squaring circuit 58.

In the 8-phase synchronizing circuit illustrated in FIG. 6, signals advanced in phase by $(\pi/16)$ with respect to the first to fourth demodulated signals, can be obtained. In the adder 45 is added the third demodulated signal as passed through the attenuator 42 to the first demodulated signal, in the adder 46 is added the fourth demodulated signal as passed through the attenuator 43 to the second demodulated signal, in the subtractor 47 is subtracted the first demodulated signal as passed through the attenuator 41 from the third demodulated signal, and in the subtractor 48 is subtracted the second demodulated signal as passed through attenuator 44 from the fourth demodulated signal. The amplitude ratio between the respective input signal pairs are selected at $1 : \tan(\pi/16)$.

Through the above-mentioned operations, the first to fourth demodulated signals can be advanced by $(\pi/16)$. It is to be noted that while all the phase-shifters in FIGS. 3 and 6 were explained in connection with the direction of phase advance, either polarity of phase shift can be selected and the direction of phase retardation could be considered. In that case, it is only necessary to exchange the adders and the subtractors.

Figure 8:
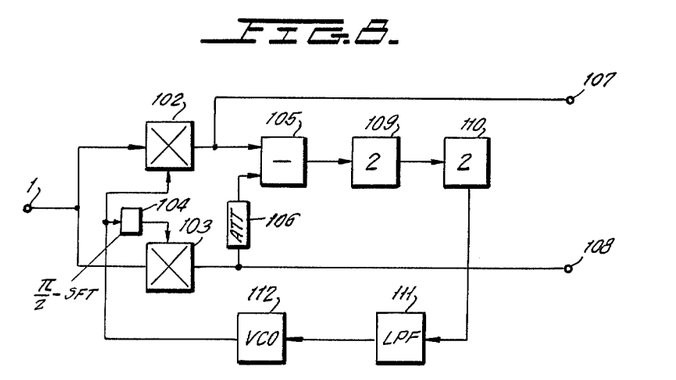
FIG. 8 shows another preferred embodiment of the present invention as applied to a 4-phase phase synchronizing circuit.
Figure 10:
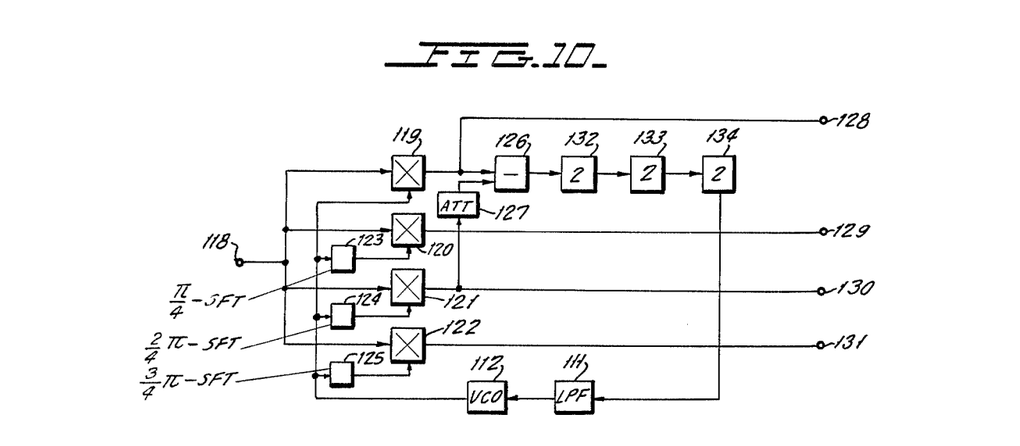
FIGS. 10 and 12 shows other preferred embodiments of the present invention as applied to 8-phase synchronizing circuits.
Figure 12:
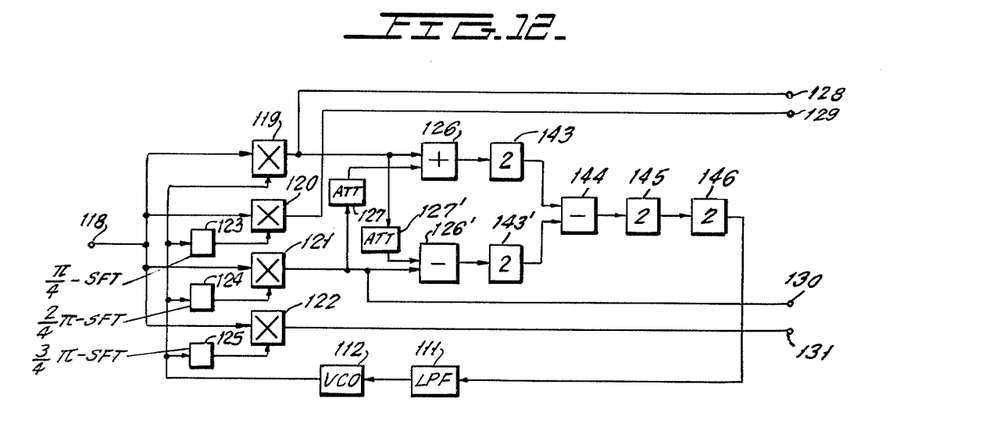

Further modified embodiments of the present invention in which the circuit is more simplified than the circuit constructions shown in FIGS. 3 and 6, are illustrated in FIG. 8 and in FIGS. 10 and 12.

FIG. 8 shows a more preferred embodiment of the present invention as applied to a 4-phase phase detector circuit, in which reference numeral 1 designates an input signal terminal; 102, a first phase detector; 103, a second phase detector; 104, a $(\pi/2)$ phase-shifter; 105, a subtractor; 106, an attenuator; 107, a first demodulated signal output terminal; 108, a second demodulated signal output terminal; 109 and 110, squaring circuits; 111, a low-pass filter; and 112, a voltage controlled oscillator. The operation of this phase synchronizing circuit will be described hereunder.

The output of the voltage controlled oscillator 112 oscillating approximately at the input signal frequency is branched into two, one being fed to the first phase detector 102, the other being fed to the second phase detector 103 via the $(\pi/2)$ phase-shifter 104. The 4-phase input signal is applied to the first and second phase detectors 102 and 103 in-phase. A first demodulated signal is obtained at the output terminal 107 of the first phase detector 102, while a second demodulated signal is obtained at the output terminal 108 of the second phase detector 103. The first demodulated signal is a signal advanced by $(\pi/2)$ radians with respect to the second demodulated signal. The two demodulated signals are fed to the subtractor 105, after the second demodulated signal has been attenuated through the attenuator 106 to select the amplitude ratio between the first demodulated signal and the second demodulated signal at $1 : \tan(\pi/8)$. Through these operations, a single advanced in phase by $(\pi/8)$ radians relative to the input to the subtractor 105 is obtained at the output of the subtractor 105. This output is applied to the squaring circuit 109, from which a frequency-doubled output can be obtained according to the mathematical formula $\sin^2\theta = (1-\cos 2\theta)/(2)$. Further, if the $\cos 2\theta$ component of this output is applied to the squaring circuit 110, then it is frequency-double therein and a quadruple frequency-multiplied phase error signal can be obtained as an output from the squaring circuit 110. It is to be noted that as the squaring circuit, for instance, a multiplier circuit which delivers a product of two input voltage signals at its output can be employed.

Figure 9:
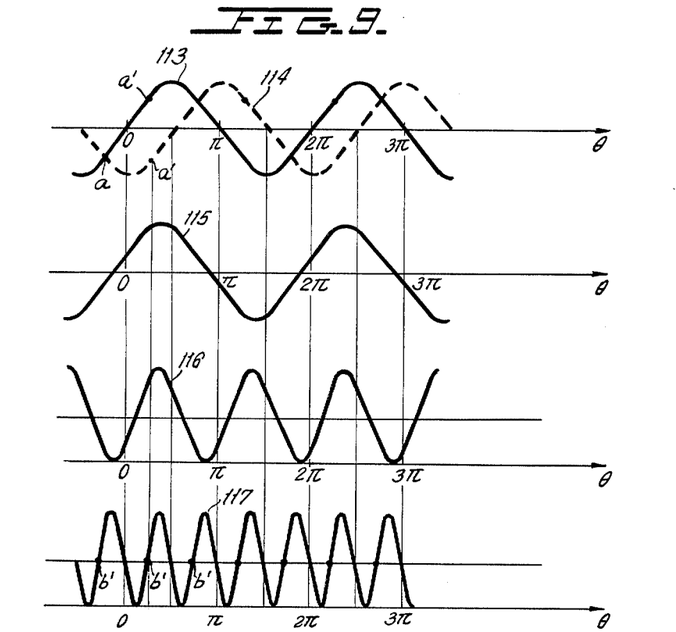
FIG. 9 shows waveforms at various points in the circuit shown in FIG. 8.

Waveforms at the respective circuit components as described above are shown in FIG. 9. Reference numeral 113 designates an output signal of the first detector 102; 114, that of the second phase detector 103; 115, that of the subtractor 105, 116, that of the squaring circuit 109; and 117, that of the squaring circuit 110. As shown in FIG. 9, since the phase stable points $a'$ of the demodulated signals 113 and 114 and the phase stable points $b'$ of the phase error signal 117 coincide with each other, if the phase error signal 117 is applied to the voltage controlled oscillator 112 as its control signal through the noise-removing low-pass filter 111, then the phase synchronizing circuit in FIG. 8 can operate correctly.

While it is assumed in FIG. 8 that the first demodulated signal is advanced by $(\pi/8)$ radians, it is obvious by reference to the phase error signal 117 in FIG. 9 that the phase synchronizing circuit can be constructed similarly even if the phase-shift angle should be selected either at $(-(\pi/2) \pm (\pi/8))$ or at $(\pm(\pi/8))$. The $=(\pi/8)$ phaseshifter circuit can be constructed by employing an adder in place of the subtractor 105 in FIG. 8. Also, the $(-(\pi/2) \pm (\pi/8))$ phase-shifter circuit can be constructed of a circuit for adding or subtracting the first and second demodulated signal at an amplitude ratio of $(\tan(\pi/8) : 1)$. It is to be noted that in the case where the phase-shift angle is selected either at $(-(\pi/2) - (\pi/8))$ or at $(-\pi/8)$ it is necessary to invert the polarity of the phase error signal 117 because the phase stable point $b'$ of the phase error signal 117 is shifted by $(\pi/4)$ and thereby the gradient of the stable operating range of the phase error signal is inverted.

FIG. 10 shows a more preferred embodiment of the present invention as applied to an 8-phase synchronizing circuit, in which reference numeral 118 designates an input signal terminal; 119, a first phase detector; 120, a second phase detector; 121, a third phase detector; 122, a fourth phase detector; 123, a $(\pi/4)$ phase-shifter; 124, a $(\pi/4)$ phase-shifter; 125, a $(\pi/4)$ phase-shifter; 126, a subtractor; 127, an attenuator; 128, an output terminal of a first demodulated signal; 129, an output terminal of a second demodulated signal; 130, an output terminal of a third demodulated signal; 131, an output terminal of a fourth demodulated signal; and 132 ~ 134, squaring circuits.

The phase-shifter circuit section in this embodiment is constructed in such manner that the amplitude ratio of the first demodulated signal to the third demodulated signal as passed through the attenuator 127 is selected at $1 : \tan(\pi/16)$ and said two signals are subjected to subtraction in the subtractor 126, and consequently, with respect to the first demodulated signal, a signal is obtained at the output of the subtractor 126 that is advanced in phase by $(\pi/16)$ radians relative to the input signal thereof. Still further, the output of said subtractor 126 is frequency-multiplied by a factor of 8 as passed through the squaring circuits 132 ~ 134, resulting in a phase error signal.

Figure 11:
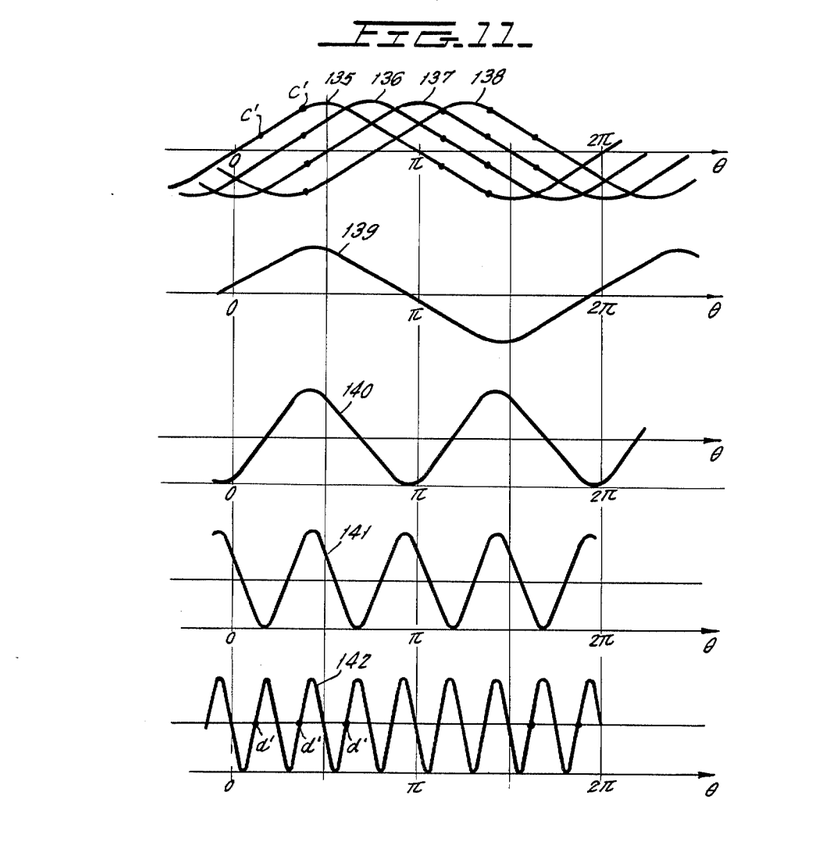
FIG. 11 shows waveforms at various points in the circuit shown in FIG. 10.

Waveforms at the respective circuit components in FIG. 10 are shown in FIG. 11. In this figure, reference numeral 135 designates an output signal of the first phase detector 119; 136, that of the second phase detector 120; 137, that of the third phase detector 121; 138, that of the fourth phase detector 122; 139, that of the subtractor 126; 140, that of the squaring circuit 132; 141, that of the squaring circuit 133; and 142, that of the squaring circuit 134. The abscissa $\theta$ represents a phase difference between the input signal and the output signal of the voltage controlled oscillator 112 at the input points of the first phase detector 119. Since the phase stable points $c'$ of the demodulated signals and the phase stable point $d'$ of the phase error signal 142 coincide with each other, the phase synchronizing circuit in FIG. 11 can operate correctly.

It is assumed in FIG. 10 that the first demodulated signal is advanced in phase by $(\pi/16)$ radians, it is obvious by reference to the phase error signal 142 in FIG. 11 that the phase synchronizing circuit according to the present invention can be constructed similarly even if the phase-shift angle is selected at $(\pm \pi/16)$, $(-\pi/2 \pm \pi/16)$, or $(-\pi/4 \pm \pi/16)$. The $-\pi/16$ phase-shifter circuit can be constructed by an adder in place of the subtractor 126 in FIG. 10. Also, the $(-\pi/4 \pm \pi/16)$ phase-shifter circuit can be constructed of a circuit for adding or subtracting the second and fourth demodulated signals at an amplitude ratio of $1 : \tan(\pi/16)$.

The $(-\pi/2 \pm \pi/16)$ phase-shifter circuit can be constructed of a circuit for adding or subtracting the first and third demodulated signals at an amplitude ratio of $\tan \pi/16 : 1$. The $(-\pi/4 \pm \pi/16)$ phase-shifter circuit can be constructed of a circuit for adding or subtracting the second and fourth demodulated signals at an amplitudes ratio of $\tan \pi/16 : 1$. It is to be noted that in case that the phase-shift angle is selected at $(-\pi/16)$, $(-\pi/4 - \pi/16)$, $(-\pi/2 - \pi/16)$ or $(-\pi/4 - \pi/16)$ it is necessary to inert the polarity of the phase error signal 142 because the phase stable points $d'$ of the phase error signal 142 are phase-shifted by $\pi/8$ radians and the gradient of the stable operation range of the phase error signal 142 is inverted.

Figure 13:
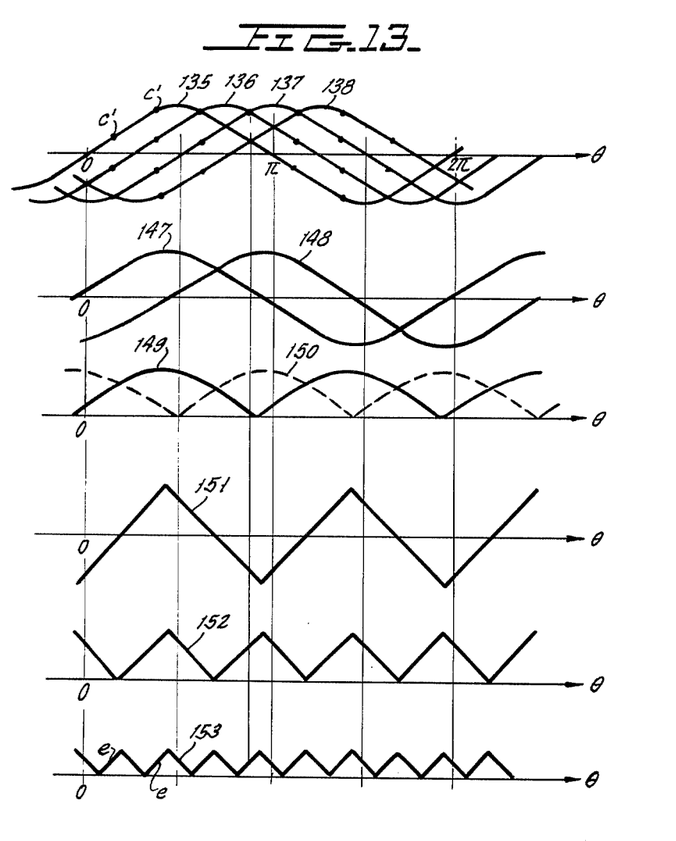
FIG. 13 shows waveforms at various points in the circuit shown in FIG. 12.

FIG. 12 shows another preferred embodiment of the 8-phase phase synchronizing circuit. This circuit arrangement comprises an increased number of component elements with respect to that shown in FIG. 10, but it necessitates far less component elements than that shown in FIG. 6. In this figure, component elements designated by similar reference numerals to those in FIG. 10 have like functions, reference numerals 126' and 144 designate subtractors, 127', an attenuator; and 143, 143', 145 and 146, squaring circuits (full-wave rectifier circuits being employed in this circuit arrangement). Waveforms at the respective circuit components in this circuit shown in FIG. 13. Reference numerals 135 ∼ 138 designate output signals of the first to fourth phase detectors; 147, an output signal of the adder 126; 148, that of the subtractor 126'; 149, that of the squaring circuit 143; 150, that of the squaring circuit 143'; 151, that of the subtractor 144; 152, that of the squaring circuit 145; and 153, that of the squaring circuit 146. The phase stable points $c'$ of the demodulated signals 135 ∼ 138 and the phase stable points $e$ of the phase error signal 153 coincide with each other. It is assumed in FIG. 12 that the first demodulated signal 135 and the third demodulated signal 137 are advanced by $\pi/16$ radians, respectively. These phase-shifter circuit sections are composed of the adder 126 and attenuator 127, and the subtractor 126' and attenuator 127'. Since the operation of the above-described circuit arrangement can be readily understood from the description of the circuit arrangement shown in FIGS. 10 and 11, explanation thereof will be omitted here.

More generalizing the aforementioned features, in a $2^n$-phase ($n=2, 3, 4, \ldots$) phase synchronizing circuit, it is only necessary to provide $2P$ phase-shifters for phase-shifter $2^p$ demodulated signals among the demodulated signals of said phase detectors by $\pi/2^{n+1}$ radians by adding or subtracting a demodulated signal that is orthogonal to said $2^p$ demodulated signals to or from said $2^p$ demodulated signals at an amplitude ratio of $1 : \tan(\pi/2^{n+1})$.

As described above, according to the present invention, a very simplified phase synchronizing circuit can be realized. Especially in the case of phase synchronizing circuits of 8 or more phases, the circuit construction can be extremely simplified in comparison to the phase synchronizing circuits in the prior art.

Figure 14:
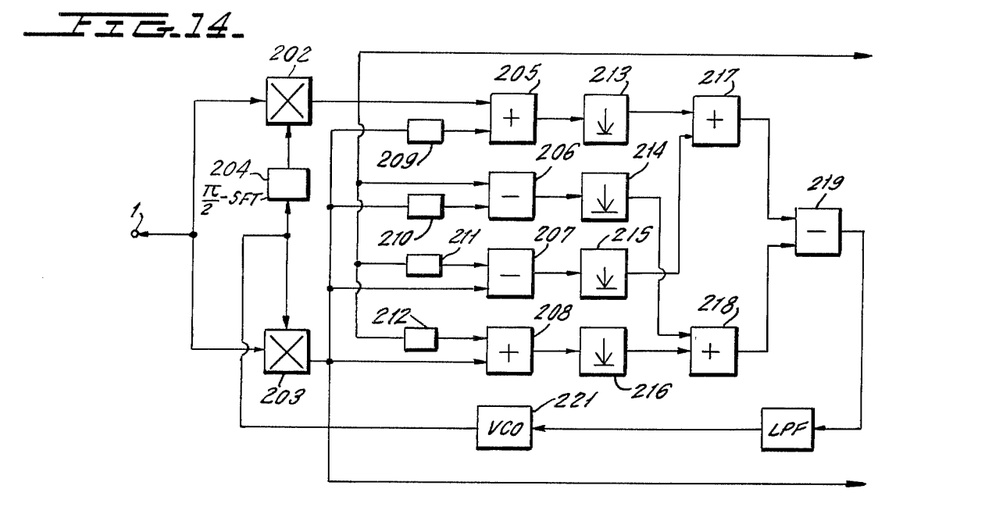
FIG. 14 shows still another preferred embodiment of the 4-phase phase synchronizing circuit according to the present invention.
Figure 15:
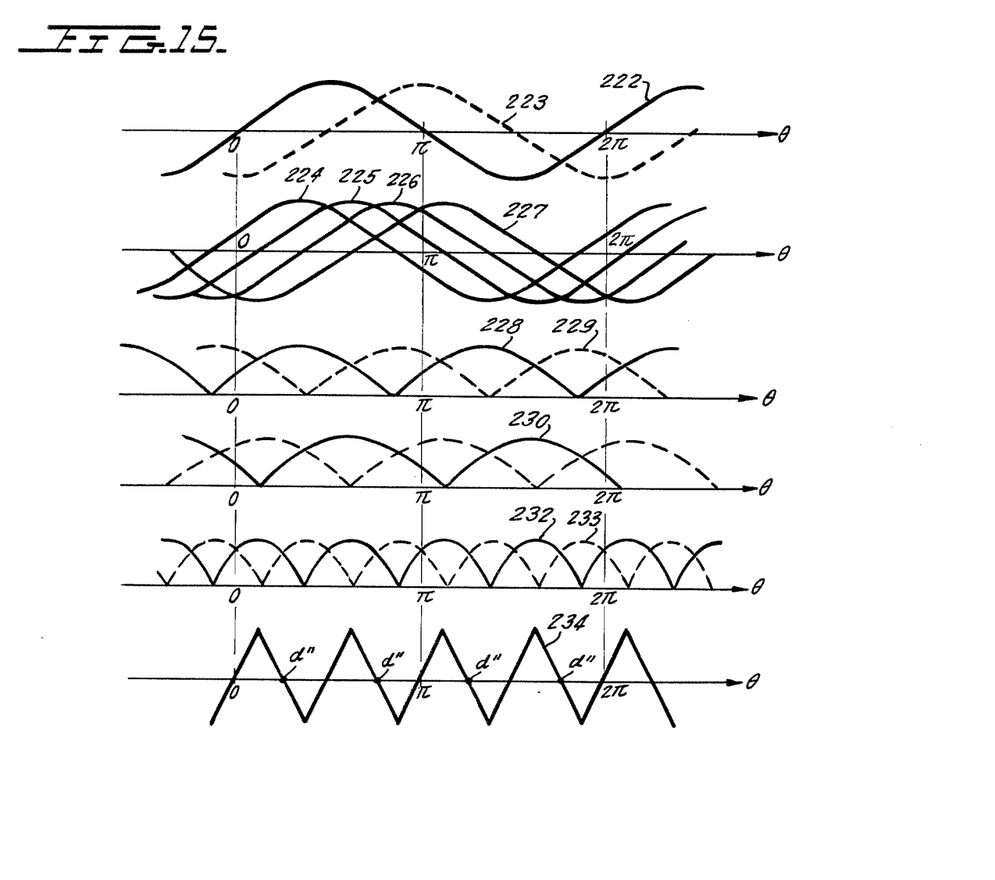
FIG. 15 showns signal waveforms at various points in the circuit shown in FIG. 14.

Still further, a more preferred embodiment of the present invention that eliminates both the first and second disadvantages as described in the beginning of this specification, is illustrated in FIG. 14 as applied to a 4-phase phase synchronizing circuit, and waveforms at the various circuit components in FIG. 14 are shown in FIG. 15. In FIG. 14, reference numeral 1 designates an input signal terminal; 202, a first phase detector; 203, a second phase detector; 204, a $(\pi/2)$ phase-shifter; 205 and 208, adders; 206 and 207, subtractors; 209 to 212, attenuators; 213 to 216, full-wave rectifier circuits; 217 and 218, adders; 219, a subtractor; 220, a low-pass filter; and 221, a voltage controlled oscillator.

In FIG. 15, reference numeral 222 designates a second demodulated signal; 223, a first demodulated signal; 224, an output signal of the subtractor 207; 225, that of the adder 208; 226, that of the adder 205, 227, that of the subtractor 206; 228, that of the full-wave rectifier circuit 215; 229, that of the full-wave rectifier circuit 213; 230, that of the full-wave rectifier circuit 216; 231, that of the full-wave rectifier circuit 214; 232, that of the adder 217, 233, that of the adder 218; and 234, that of the subtractor 219. It is to be noted that the abscissa $\theta$ represents a phase difference between the input signal and the output signal of the voltage controlled oscillator 221 at the input points of the second phase detector 203. On the waveform 234, points $d''$ represent phase stable points. The operation of the circuit arrangement in FIG. 14 will now be explained with reference to FIG. 15. The output of the voltage controlled oscillator 221 that is oscillating approximately at the input signal frequency, is branched into two, one being fed to the second phase detector 203, the other being fed to the first phase detector 202 via the $(\pi/2)$ phase-shifter 204. In addition, the first and second phase detectors 202 and 203 receive an input signal through the terminal 1, the first demodulated signal (waveform 223) being obtained at the output of the first phase detector 202, and the second demodulated signal (waveform 222) is obtained at the output of the second phase detector 203. The second demodulated signal is advanced in phase by $(\pi/2)$ radians relative to the first demodulated signal. Said two demodulated signals are fed to the adders 205 and 208, and subtractors 206 and 207. To the adder 205 are fed the first demodulated signal and the second demodulated signal as passed through the attenuator 209 at an amplitude ratio of $1 : \tan \pi/8$, and at the output of said adder 205 is obtained a first demodulated signal advanced by $\pi/8$ radians with respect to the first demodulated signal at its input (waveform 226). To the subtractor 206 are fed the first demodulated signal and the second demodulated signal as passed through the attenuator 210 at an amplitude ratio of $1 : \tan \pi/8$, and at the output of said subtractor 206 is obtained a first demodulated signal that is delayed by $\pi/8$ radians with respect to the first demodulated signal at its input (waveform 227). Likewise, the second demodulated signal and the first demodulated signal as passed through the attenuator 211 are fed to the subtractor 207 at an amplitude ratio of 1 : tan $\pi/8$, and a second demodulated signal advanced by $\pi/8$ radians with respect to the second demodulated signal at its input (waveform 224) is obtained at the output of the subtractor 207. The second demodulated signal and the first demodulated signal as passed through the attenuator 212 are fed to the adder 208 at an amplitude ratio of 1 : tan $\pi/8$, and a second demodulated signal at its input (waveform 225) is obtained at the output of the adder 208. The output signals of these circuits 205, 206, 207 and 208 are fed to the full-wave rectifier circuits, 213, 214, 215 and 216, respectively, which deliver at their outputs double frequency-multiplied signals as shown by the waveforms 229, 231, 228 and 230, respectively. Still further, the output signals of the full-wave rectifier circuit 213 and 215 are applied to the adder 217, where the signals are further double frequency-multiplied, so that at the output of the adder 217 is obtained a quadruple frequency multiplied phase error signal (waveform 232). On the other hand, the output signals of the full-wave rectifier circuits 214 and 216 are applied to the adder 218, where the signal is further double frequency-multiplied, so that at the output of the adder 218 is obtained a quadruple frequency-multiplied phase error signal (waveform 233). Though both the phase error signals (waveforms 232 and 233) at the outputs of the adder 217 and 218 include D.C. components (not shown), if said two signals are subjected to subtraction in the subtractor 219, then at the output of the subtractor 219 is obtained a phase error signal (waveform 234) free of any D.C. component, because the respective phase error signals are in an opposite phase relation to each other. Therefore, if the output of the subtractor 219 is applied to the voltage controlled oscillator 221 as a control signal via the low-pass filter 220 for removing a noise component, then a phase-locking frequency would not be varied despite a level variation of the input signal, and thereby a phase synchronizing circuit which operates stably, can be obtained. Therefore, the first and second disadvantages in the prior art as referred to in the beginning of the specification, can be eliminated. It is to be noted that the adders 217 and 218, respectively, can be replaced by combinations of a subtractor and a full-wave rectifier circuit. In the case where such a replacement has been effected, then the full-wave rectifier circuits 213 ~ 216 could be replaced by squaring circuits employing multiplier circuits.

While we have described above one preferred embodiment of the present invention as applied to a 4-phase phase synchronizing circuit with reference to FIG. 14, more generally, the feature of the present invention as applied to a $2^n$-phase ($n=2, 3, 4, ...$) phase synchronizing circuit can be summarized as follows: That is, the feature of the invention exists in the circuit arrangement such that $2^n$ demodulated signals that are phase-shifted by $\pm\pi/2^{n+1}$ radians with respect to $2^{n-1}$ demodulated signals are obtained by adding and subtracting a demodulated signal that is orthogonal to said $2^{n-1}$ demodulated signals to and from said $2^{n-1}$ demodulated signals at an amplitude ratio of 1 : tan $(\pi/2^{n+1})$, a pair of $2^n$ frequency-multiplied output signals which are in an opposite phase relation to each other, are derived from said $2^n$ demodulated signals, and by subjecting said frequency-multiplied output signals to subtraction, a $2^n$-fold frequency-multiplied phase error signal not containing a D.C. component can be obtained.

As described above, according to our subject invention, by employing a phase-shifter consisting of an attenuator and an adder or subtractor in a phase synchronizing circuit, an extremely excellent phase synchronizing circuit, that eliminates the first and second disadvantages of the prior art as referred to in the beginning of this specification, can be obtained.

Since many modifications can be made in the above construction and many apparently widely different embodiments of this invention can be made without departing from the scope thereof, it is intended that all the matter contained in the above description or shown in the accompanying drawings shall be interpreted as illustrative and not in a limiting sense.

What is claimed is:

1. A $2^n$-phase synchronizing circuit wherein n is a positive integer equal to or greater than 2 comprising:
   $2^{n-1}$ phase detectors each having a pair of inputs and an output, a first input of each phase detector being adapted to receive the phase modulated input signal and the remaining input of each detector receiving a signal against which the input signal is to be phase compared;
   phase shifting means each coupled to selected pairs of said phase detectors for shifting the phase of the output signal of at least one of the phase detectors of said pair by $(\pi/2^{n+1})$ radians;
   the output of each of said phase shifting means undergoing frequency doubling;
   a plurality of sets of summing means wherein the means of the first of said sets are each connected to a pair of said frequency doubling means and wherein the means of succeeding sets are coupled to the outputs of a pair of means of the previous set reducing the total number of outputs by two the number of sets being sufficient to reduce the $2^n$ signals down to a pair (i.e. $2^0$) of signals;
   means for creating a signal representing the difference of the remaining pair of signals;
   said variable frequency oscillator being controlled by the difference signal.

2. The synchronizing circuit of claim 1 further comprising low pass filter means coupled between said difference generating circuit means and said variable frequency oscillator.

3. The apparatus of claim 1 wherein said variable frequency oscillator comprises a voltage controlled oscillator.

4. The apparatus of claim 1 further comprising phase-shifting means coupled between the output of said variable frequency oscillator and the second inputs of said phase detectors for shifting the phase of the signal appearing at the output of the variable frequency oscillator wherein the amount of phase shift is selected to enable performance of the appropriate phase detection operation.

5. The synchronizing circuit of claim 1 wherein each of said phase shifting means comprises combining circuit means having first and second inputs and attenuator means, said first input being coupled to the output of one of said phase detectors and said attenuator means being coupled between another one of said phase detectors and a second input of said combiner means, the remaining one of said phase detector means which is selected being that one whose signal is orthogonal to the signal of the phase detector means coupled to the first input of said combiner means.

6. The synchronizing circuit of claim 5 wherein said attenuator means attenuates the output signal of the phase detector means coupled thereto by an amount sufficient to enable the combiner circuit means to shift the phase angle of the signal applied to the combiner circuit means first input by $(\pi/2^{n+1})$ radians.

7. The synchronizing circuit of claim 1 wherein said frequency doublers comprise full wave rectifier means.

8. A $2^n$-phase PSK demodulator, n being a positive integer greater than or equal to 2, comprising:
   (a) variable frequency generator means for generating $2^{n-1}$ phase comparison signals, the frequency and absolute phase of each of said phase comparison signals being determined by a phase error signal applied to said variable frequency generator means, the relative phase of each of said $2^{n-1}$ phase comparison signals being displaced from the remaining said phase comparison signals by $2K\pi/2^n$ radians, where K is an integer meeting the relationship $0<K<2^{n-1}$;
   (b) $2^{n-1}$ phase detectors, each of said phase detectors for generating a demodulated output signal representative of a phase comparison between an incoming $2^n$-phase PSK signal and a different one of said phase comparison signals;
   (c) $2^p$-phase shifting means, p being $0 \leq p \leq n-1$, each of said phase shifting means for shifting the phase of the demodulated output signal generated by a respective one of said phase detectors by $\pi/2^{n+1}$ radians;
   (d) means for synthesizing the outputs of said phase shifting means to generate said phase error signal.

9. The demodulator of claim 8 wherein each of said phase shifting means shifts the phase of the demodulated signal generated by its said respective phase detector by adding or substracting a second one of said demodulated signals to or from said demodulated signal generated by its said respective phase detector at an amplitude ratio 1 : tan $(\pi/2^{n+1})$, said second one of said demodulated signals being orthogonal to said demodulated signal generated by said respective phase detector.

10. The demodulator of claim 9 wherein each of said phase shifting means comprises:
   arithmetic means for either adding or subtracting two signals, said arithmetic means having a first and a second input and an output, said first input of said arithmetic means being coupled to said demodulated signal generated by said respective phase detector;
   an attenuator having an input and an output, said attenuator output being coupled to said second input of said arithmetic means, said attenuator input being coupled to said second one of said demodulated signals.

11. The demodulator of claim 8 wherein said variable frequency generator means comprises:
   a voltage controlled oscillator for generating an output signal having a frequency and phase determined by said phase error signal;
   $(2^{n-1}-1)$ phase shifters, each of said phase shifters for shifting the output signal generated by said voltage controlled oscillator by a different one of $2K\pi/2^{n-1}$ radians.

* * * * *